United States Patent [19]
Biram

[11] 3,910,055
[45] Oct. 7, 1975

[54] CABLE ATTACHMENTS

[75] Inventor: Brian Edgar Lund Biram, Randburg, South Africa

[73] Assignee: C.C.L. Systems Limited, Surrey, England

[22] Filed: May 28, 1974

[21] Appl. No.: 473,546

[52] U.S. Cl. .................. 61/45; 403/210; 24/115
[51] Int. Cl.[2] ................................. F16G 11/00
[58] Field of Search ........... 24/115.1, 115 R, 115 K; 403/210; 85/83; 61/45 B; 52/704; 248/58, 71

[56] References Cited
UNITED STATES PATENTS
1,057,975  4/1913  Newhall et al. .................... 85/83
2,827,680  3/1958  Gibson .............................. 403/210

FOREIGN PATENTS OR APPLICATIONS
5,668  3/1914  United Kingdom ................ 403/210

Primary Examiner—Paul R. Gilliam
Assistant Examiner—Doris L. Troutman
Attorney, Agent, or Firm—Caesar, Rivise, Bernstein & Cohen

[57] ABSTRACT

A cable anchor element with a socket at one end and a load supporting element at the other end, the load supporting element having an apertured head, therebeing at least two projecting shoulders formed on the portion intermediate the socket and the head. The cable anchor element is cast from malleable iron.

The invention also comprises a method of securing the cable anchor element to a cable by receiving the end of the cable in the cable anchor element and exerts pressure on the element to achieve a flow of metal to complete the joint.

2 Claims, 4 Drawing Figures

CABLE ATTACHMENTS

This invention relates to means for providing an attachment at the end of a flexible stranded member such as a cable, wire rope, winding rope or the like or at the end of a rigid rod all herein referred to as "cables" and to a method of providing such an attachment.

One way of providing an anchor point at the end of a cable is to loop the cable end into the form of an eye. The free end of the cable is attached to the length of the parent cable by splicing or by swaging a collar around the cable sections. Such cable anchor points are used particularly in mining operations where one end of a cable has an eye or other anchor point and the other end is grouted or cemented into a hole in the rock strata. Such eyes are often ineffective, since they collapse under high tension. Spliced and collared anchor points are relatively expensive because in the former case an appreciable amount of cable is wasted and in the latter case the aluminum collars used add to the cost. In use, some cable strands in the loop may tend to fray and break to form sharp projections which constitute a danger to personnel.

Another method of forming an anchor point is to bend a high tensile steel rod into a loop to form an eye at the end of the rod. The bending weakens the eye portions considerably.

It is an object of this invention to provide an anchor point for cable ends which will allow interlaced cables and/or mesh to be held close against the wall of a mine working area or to support ventilation ducting or other conduits close to the wall.

According to this invention a cable anchor element comprises a socket at one end and a load supporting formation at the other end, the cable anchor element being cast of a malleable metal.

The cable anchor element preferably has at least two shoulders located on the portion intermediate the socket and the loop support formation on opposite sides, the shoulders sloping towards the socket.

Preferably the load supporting formation comprises an apertured head, substantially circular in plan and of thickness approximately the same as the external diameter larger and of external diameter larger than the diameter of the external socket, the curved sides of the head converging towards the socket.

In an alternative construction the load supporting formation comprises at least one hook member extending from the tubular socket and being curved so that the free end of the hook projects towards the socket. Preferably the load supporting formation comprises four of the hook members equally spaced apart around the tubular socket.

The invention includes a method of securing a cable anchor element to a cable comprising receiving the end of a cable in the socket of a cable anchor element and swaging, exploding or drawing said tubular end using appropriate dies or explosive material, together with the formed cable having a cable anchor element secured to it.

Two preferred embodiments of the invention are described by way of example only, reference being made to the accompanying drawings in which:-

Figure 1:
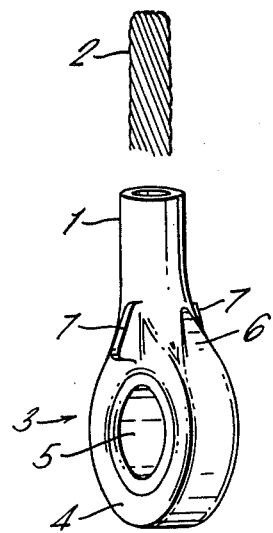
FIG. 1 is an isometric exploded view of a cable anchor element.
Figure 2:
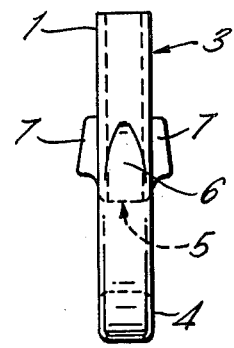
FIG. 2 is an side elevation of the element of FIG. 1.

In the embodiment of FIGS. 1 and 2 the cable anchor element comprises a malleable casting having a tubular socket 1 at one end dimensioned to fit freely over a cable end 2 which it is to be secured: the length of the socket is preferably at least five times the diameter of the cable. The opposite end of the element comprises a generally circular load supporting element 3. The anchor element may be cast in one piece from for example, perlitic malleable iron or white heart malleable iron.

The load supporting element comprises a head 4, substantially circular in plan and of a thickness equal to the external diameter of the tubular socket 1. The head has an external diameter appreciably larger than the external diameter of the socket and has a central hole 5. The integrally formed intermediate portions 6 joining the head to the socket converge gently from the head so that the anchor element appears to be of substantially tear-drop shape in side elevation.

Each planar side of the portions 6 has a shoulder 7. As best shown in FIG. 2, the ridge 7 slopes downwardly towards the socket 1.

Figure 3:
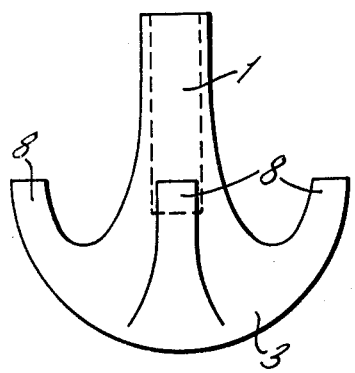
FIG. 3 is a side elevation of another anchor element.

The embodiment shown in FIG. 3 comprises a tubular socket 1 and a load supporting element 3 formed of four equally spaced apart hooks 8 each rooted to the socket.

Figure 4:
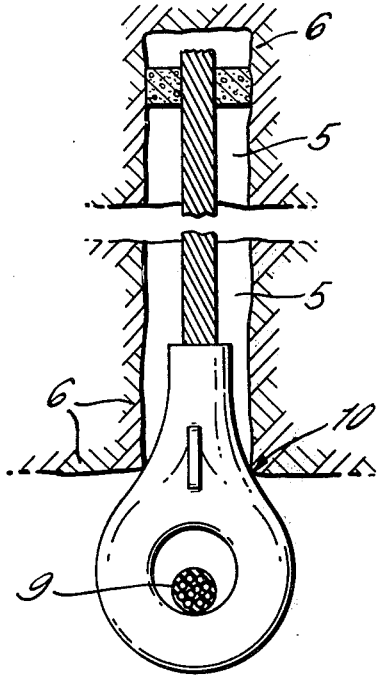
FIG. 4 shows an anchor element of FIG. 1 secured to a cable.

In use, a cable end 2 is received in one end of the socket 1 of either embodiment and is secured therein, for example, exploding or drawing. The formed cable having a cable anchor element may be received in the hole 5 in a wall 6 (FIG. 4) of say a mine working, and then grouted therein. Because of the taper of the shoulder 7, the head portion 4 of the element may also be received slightly in the hole at 10 so helping to urge the head flush to the wall 6.

The head may be struck with a hammer to ensure a good engagement between the element and the sides of the hole. Grouting material already introduced in the hole will not easily escape. Wire mesh 9 received in the hole 5 may be closely held against the wall.

Having now particularly described and ascertained the invention and in what manner the same is to be performed, we declare that what we claim is:

1. A cable anchor element having a socket at one end for receiving only a straight portion of a cable end therein and a load supporting member at the other end, said cable support element including an intermediate section that includes a plurality of radially extending members which gently converge from a widest point adjacent said load supporting member to a narrowest point surrounding said socket, said cable anchor element being securable in a recess of a wall with said socket end inserted in said recess and said radially extending members of said intermediate section secured in the mouth of said recess so that said load supporting member is exposed to support an external member adjacent said wall, said supporting element comprises at least two hook members, said hook member being rooted to said intermediate sections with said hook members converging gently toward a narrowest point surrounding said socket.

2. The cable anchor element of claim 1 wherein said load supporting element comprises an apertured head, said head being substantially circular in plan and of a thickness substantially equal to the external diameter of said one end having said socket, the diameter of said circular head being substantially larger than said diameter of said one end, said head further including a central hole which extends through said head so that a portion of said external member may be held within said hole.

* * * * *